(12) United States Patent
Gu et al.

(10) Patent No.: US 6,283,168 B1
(45) Date of Patent: Sep. 4, 2001

(54) SHAPED THREE-DIMENSIONAL ENGINEERED FIBER PREFORMS WITH INSERTION HOLES AND RIGID COMPOSITE STRUCTURES INCORPORATING SAME, AND METHOD THEREFOR

(75) Inventors: Pu Gu, Apex; Mansour Hussein Mohamed, Raleigh, both of NC (US)

(73) Assignee: 3TEX, Inc., Cary, NC (US)

( * ) Notice: Subject to any disclaimer, the term of this patent is extended or adjusted under 35 U.S.C. 154(b) by 0 days.

(21) Appl. No.: 09/723,680

(22) Filed: Nov. 28, 2000

(51) Int. Cl.$^7$ .................................................. D03D 3/00
(52) U.S. Cl. ......................... 139/384 R; 139/DIG. 1; 139/363 R; 442/206
(58) Field of Search ............... 139/DIG. 1, 384 R, 139/383 R; 442/239, 135, 205, 218, 242, 301

(56) References Cited

U.S. PATENT DOCUMENTS

| | | | |
|---|---|---|---|
| 4,622,254 | * 11/1986 | Nishimura et al. | 428/102 |
| 5,021,283 | * 6/1991 | Takenaka et al. | 428/116 |
| 5,091,246 | * 2/1992 | Yasui et al. | 442/205 |
| 5,100,713 | * 3/1992 | Homma et al. | 428/102 |
| 5,173,358 | * 12/1992 | Anahara et al. | 442/206 |
| 5,270,094 | * 12/1993 | Anahara et al. | 428/113 |
| 5,343,897 | * 9/1994 | Sakatani et al. | 139/384 R |
| 5,348,056 | * 9/1994 | Tsuzuki | 139/384 R |
| 5,484,642 | * 1/1996 | Bompard et al. . | |
| 5,665,451 | * 9/1997 | Dorn et al. | 428/116 |
| 5,783,279 | * 7/1998 | Edgson et al. | 428/116 |
| 5,804,277 | * 9/1998 | Ashbee | 428/112 |
| 5,888,609 | * 3/1999 | Karttunen et al. . | |
| 6,004,888 | * 12/1999 | Sugimoto et al. | 442/60 |
| 6,010,652 | * 1/2000 | Yoshida | 264/103 |
| 6,019,138 | * 2/2000 | Malek et al. | 139/1 R |

* cited by examiner

*Primary Examiner*—John J. Calvert
*Assistant Examiner*—Robert H. Moromoto, Jr.
(74) *Attorney, Agent, or Firm*—Glasgow Law Firm

(57) ABSTRACT

A shaped three-dimensional engineered fiber preform construction having at least one insertion hole therein and rigid composite structure formed therefrom having a singular, unitary component construction, thereby providing improved and uniform finished product characteristics and performance for structural applications, particularly for use as a connector, coupling, and the like. The shaped 3-D engineered fiber preform construction of the present invention is fabricated on a 3-D weaving machine designed and configured to produce a variety of cross-sectional shapes and sizes as well as to produce a plurality of structures in series for subsequent separation and processing.

8 Claims, 5 Drawing Sheets

Process schematic for 3-D orthogonal weaving

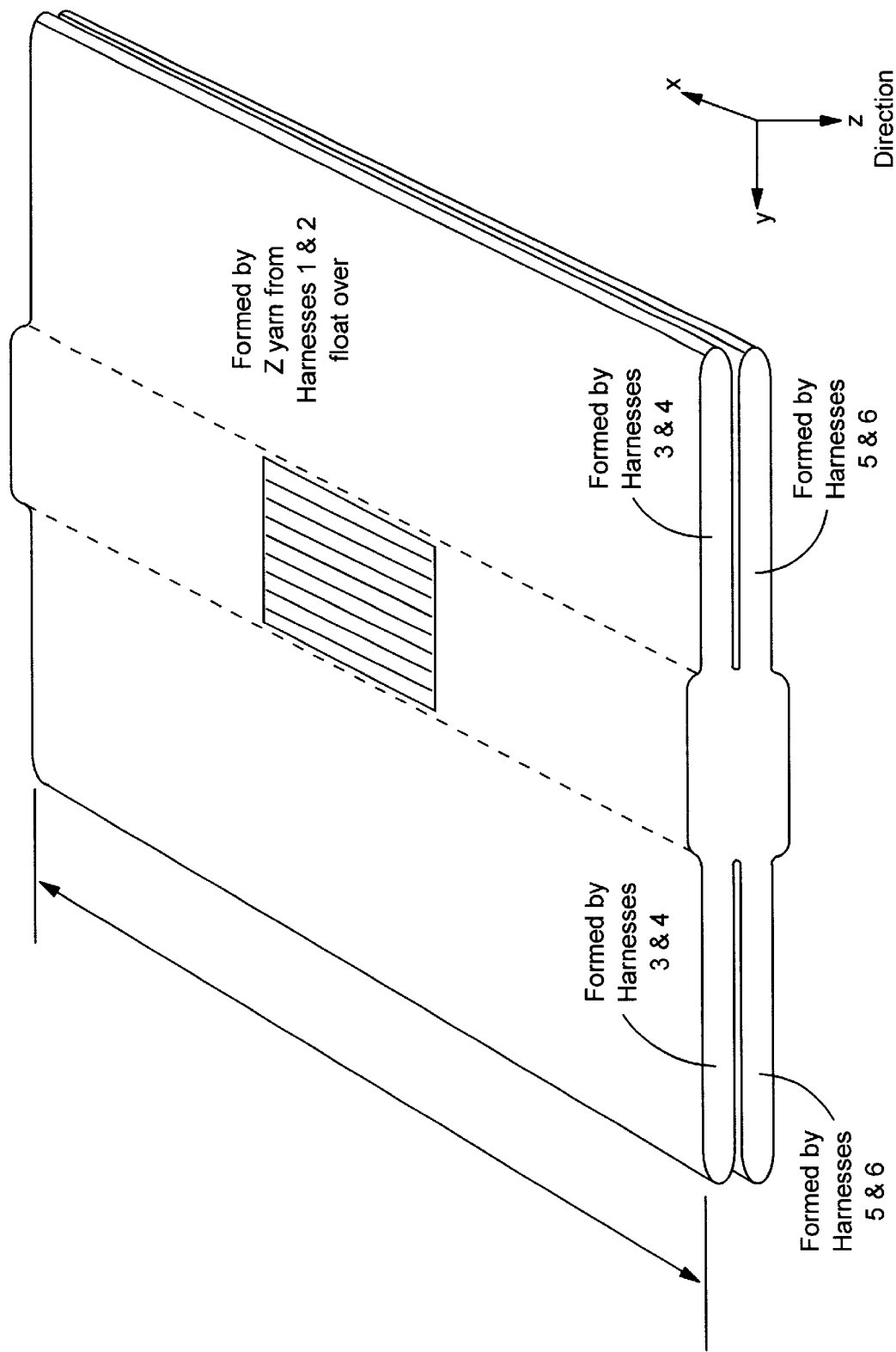

SHAPED THREE-DIMENSIONAL ENGINEERED FIBER PREFORMS WITH INSERTION HOLES AND RIGID COMPOSITE STRUCTURES INCORPORATING SAME, AND METHOD THEREFOR

BACKGROUND OF THE INVENTION (1) Field of the Invention

The present invention relates generally to the composite structures and applications thereof, more particularly, to shaped three-dimensional fabrics and rigid composite structures made therewith and methods for making same.

(2) Description of the Prior Art

In general, it is known in the art to employ multi-layer fabrics combined with a resinous treatment for forming rigid composite structures for various applications, including but not limited to infrastructure and connectors. Additionally, it is known in the art to use high performance fibers to improve the characteristics of the composite structure, including impact resistance, strength, and shear resistance. However, overall, these prior art and related structures still fail, particularly where non-uniformities exist either due to multiple shaped fabrics being spliced, joined, or otherwise combined to form the final structure; failure often occurring at the points, areas, and/or regions of non-uniformity. Therefore, no prior art has been capable of providing a singular, non-laminated fabric having varying cross-sectional area including insertion hole(s). Thus, there remains a need for a singular piece, non-laminated three-dimensional fabric having varying cross-sectional area including insertion hole(s), particularly one that may be formed into a composite structure via the introduction of resin thereinto and curing thereof.

Furthermore, no prior art provides a three-dimensional fabric having varying cross-sectional shapes and other contoured shapes, or shaped three-dimensional fabric in a range of dimensions. Thus, there remains a need for shaped three-dimensional fabric in a range of dimensions to provide components and connectors in a range of sizes for different applications and uses.

Unlike prior art multidimensional, multi-component laminated fabric composites for use as structural components, couplers, and/or connectors, the three-dimensional fabric having varying cross-sectional shapes including insertion holes of the present invention provides increased impact resistance, resistance to delamination, shear resistance, tensile strength, overall resistance to deformation and breakage, strength, and overall performance due to the uninterrupted dissipation of energy spread throughout the entire surface area, cross-sectional area, and internal structure of the fabric and the substantially uniform structural characteristics presented in the finished product. The transfer of energy is uninterrupted and the other performance characteristics of the three-dimensional fabric having varying cross-sectional shapes and structure of the present invention are improved over the prior art because no seams, splices, joints, creases, wrinkles, or non-uniformities, including discontinuity in fiber reinforcement, are present in the fabric performs before, during, or after lamination, treatment, and molding to form the finished product. Moreover, the absence of seams provides increased resistance to delamination and component or structural failure.

Additionally, prior art teaches the use of resinous treatment or coating in combination with multi-layer laminated structures to create a rigid composite structure and to improved resistance to delamination, impact resistance, strength, compression, and other characteristics. However, any and all resinous treatments, even after setting and curing, merely provide amorphous bonding between laminated layers, multiple components, and at any join, splice, or other point of connection between components, continue to be subject to delamination, reduction of strength and impact resistance in those amorphous regions.

SUMMARY OF THE INVENTION

The present invention is directed to a shaped three-dimensional fabrics having a variety of cross-sectional shapes and dimensions, including insertion holes therein and rigid composite structures formed thereof, wherein the fabric has an increased impact resistance, strength, shear strength, compression characteristics, resistance to delamination, and overall uniformity and structural integrity. Additionally, the invention is directed to a method for making the same. The invention is applicable to structural components, including but not limited to couplers and connectors. Also, the invention is applicable to other structural components where integrated insertion hole(s) are desired.

Advantageously, the invention includes lightweight, multi-layer performs having a single, integral composition, i.e., formed of a single, continuous, and integrated fabric structure that does not require splicing, joining, or otherwise connecting multiple pieces to provide a variety of cross-sectional shapes and dimensions, including insertion holes therein. As such, the present invention provides superior structural uniformity and/or continuity and performance characteristics than any prior art structure or substitute. Also, the method of manufacturing shaped three-dimensional fabrics in a variety of cross-sectional shapes and dimensions requires a single fabric-forming machine with no additional equipment or separate processes required to form insertion holes therein. Also, rigid composite structures according to the present invention do not require joining, splicing, or otherwise connecting, patterning, creating cut-out regions or overlapping material to form the final structure, shape or dimensions in order to conform to a predetermined shaped structure or component. Furthermore, the shaped three-dimensional fabric structure according to the present invention may be molded, compression molded, pressed, or otherwise manipulated into a contoured shape without delamination, creasing, folding, or making non-uniformities within layers forming the laminated structure. Also, the shaped three-dimensional fabric structure may be formed into a rigid composite structure via the addition of a resin or similar hardening material.

Accordingly, one aspect of the present invention is to provide a shaped three-dimensional fabric structure for applications requiring substantially uniform characteristics across all parts and regions of the structure. Another aspect of the present invention is to provide a shaped three-dimensional fabric structure having insertion hole(s) for use as a coupler, attach point, connector, and/or other structural components where integrated insertion hole(s) are desired. Additionally, it is an aspect of the present invention to provide a shaped three-dimensional fabric structure and rigid composite structure formed therewith for use in structural applications, including but not limited to structural components, connectors, joints, and couplers.

Also, it is an aspect of the present invention to provide a method for forming a shaped three-dimensional fabric structure, wherein the structure includes a singular component, molded preform.

Finally, it is an aspect of the present invention to provide a method for forming a shaped three-dimensional fabric structure having insertion holes and made into a rigid composite structure including the steps of weaving a 3-D engineered fiber preform, including top and bottom surface floats for forming insertion holes, separating the edges of the preform after weaving and translating the edges such that a 90 degree shift in edge plane orientation results, opening the insertion hole area, inserting the preform into a mold, preferably a shaped and closed molding, introducing a resin into the preform in the mold, and curing the resin. Additional finishing steps may be advantageously used to assure that the finished surfaces, edges, and dimensions are consistent with those desired of the end product.

Other objects and advantages of the present invention will become apparent to those skilled in the art after a reading of the following description of the preferred embodiment and the accompanying drawings, which are merely illustrative of such invention.

BRIEF DESCRIPTION OF THE DRAWINGS

FIG. 5 illustrates a cross-sectional view of a 3-D weaving material as it exits the weaving machine.

DETAILED DESCRIPTION OF THE PREFERRED EMBODIMENTS

Figure 1:
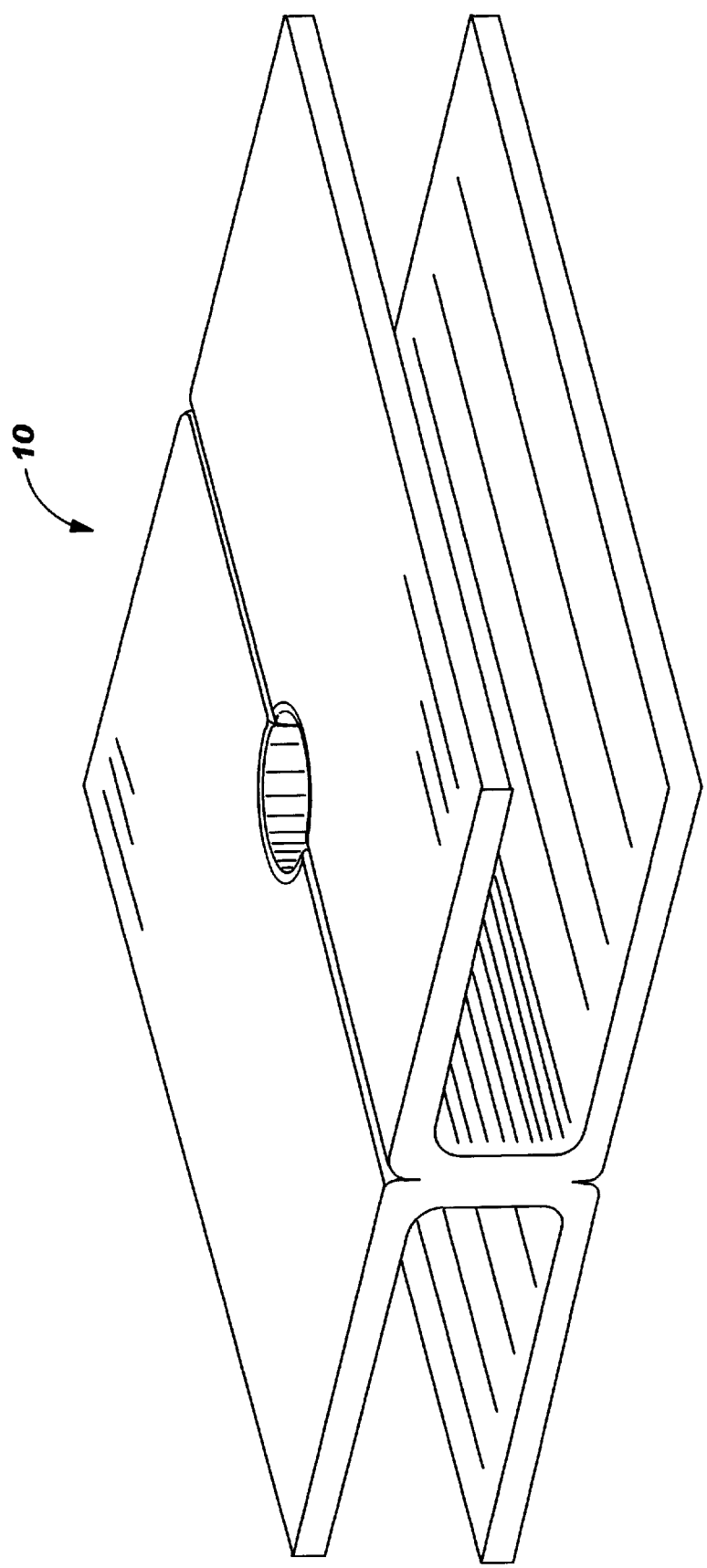
FIG. 1 is a perspective view of a preferred embodiment according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 2:
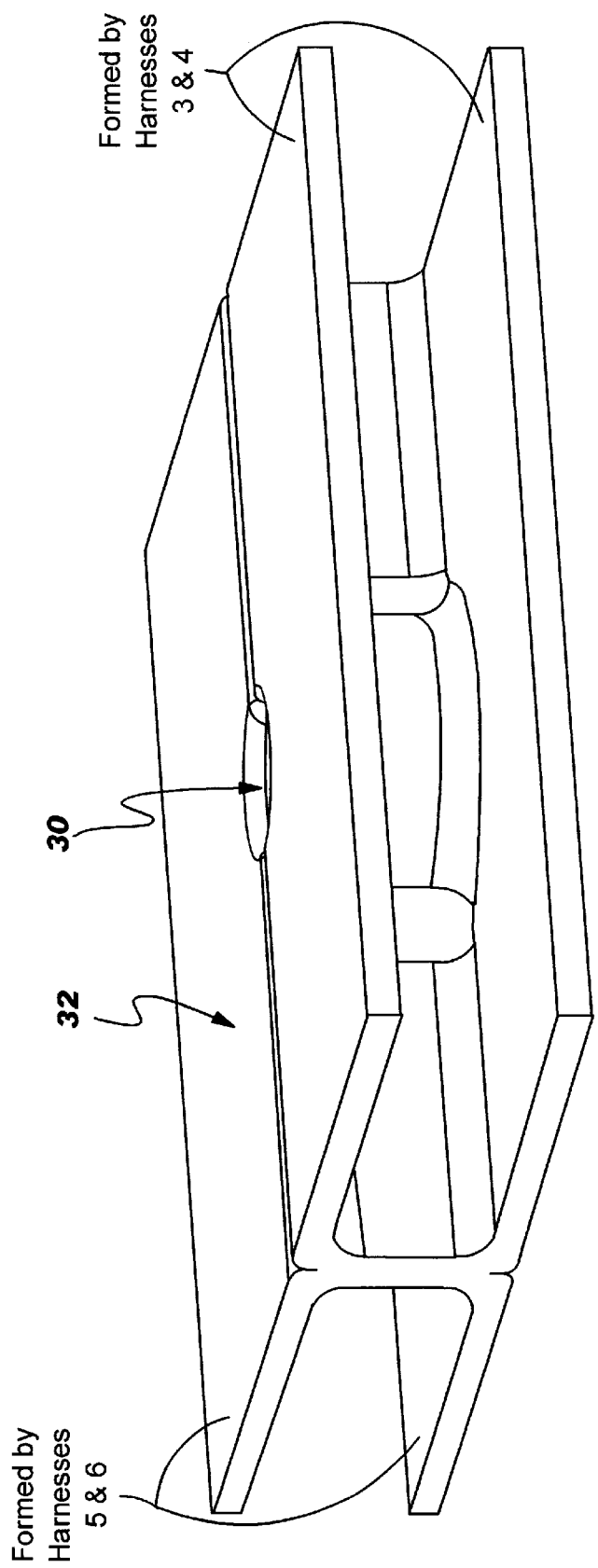
FIG. 2 is another perspective view of the preferred embodiment shown in FIG. 1, according to the present invention.

Referring now to the drawings in general and to FIG. 1 in particular, it will be understood that the illustrations are for the purpose of describing a preferred embodiment of the invention and are not intended to limit the invention thereto. FIG. 1 shows a finished rigid composite structure including a shaped, 3-D fiber preform with insertion holes woven thereinto. The composite structure with insertion hole has been re-oriented from its off-the-weaving-machine orientation (shown in FIG. 5) to form the finished shape wherein the insertion hole is seamlessly integrated with the overall preform structure. FIG. 2 shows the composite structure of FIG. 1, from a different angle than FIG. 1, to more effectively illustrate the insertion hole and separation of layers, which form the integrated, seamless preform with harness combinations 3 & 4 and 5 & 6 labeled in contrast to the orientation of the woven preform, shown in FIG. 5. While an I-beam connector is shown, other complex shaped preforms may be manufactured according the method of the present invention.

A complete disclosure of a three-dimensional fabric and method is provided in U.S. Pat. Nos. 5,085,252 and 5,465,760, both owned by the present applicant and/or assignee, and incorporated herein by reference in their entirety.

Some modifications on the dimensions are possible to be made on the machine during production, including the thickness. Depending on the load condition, can allocate the fiber percentage in XYZ direction can be allocated to meet the load requirements. Load requirements are generally dependent upon weight target & geometrical dimensions of the use of end products; note that the design and specification requirements for the shaped 3-D woven structure with insertion holes are based on dimensional requirements primarily, but also on load/performance requirements when specified by the end user.

Figure 3:
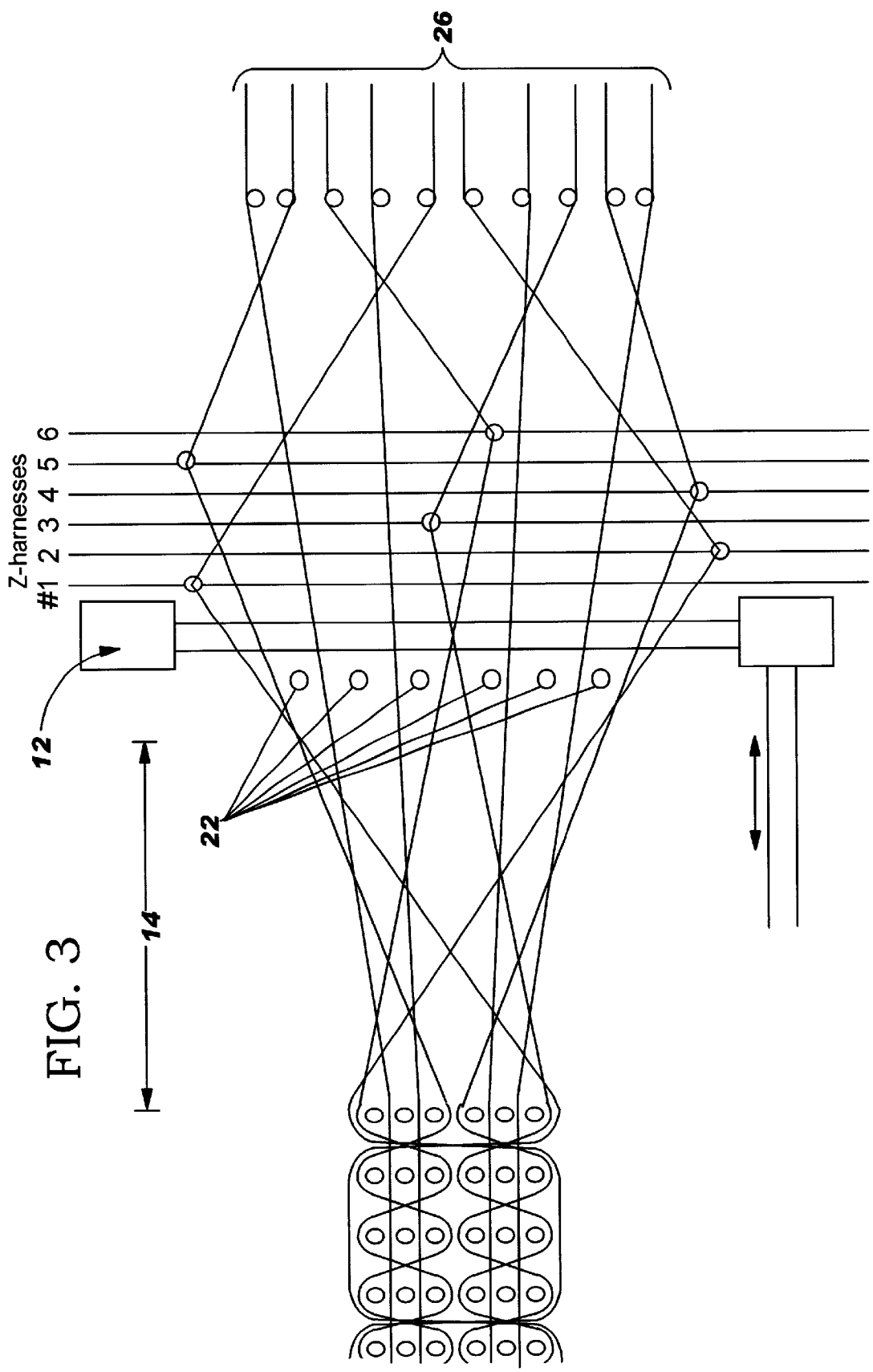
FIG. 3 is schematic of a 3-D orthogonal weaving according to the present invention.
Figure 4:
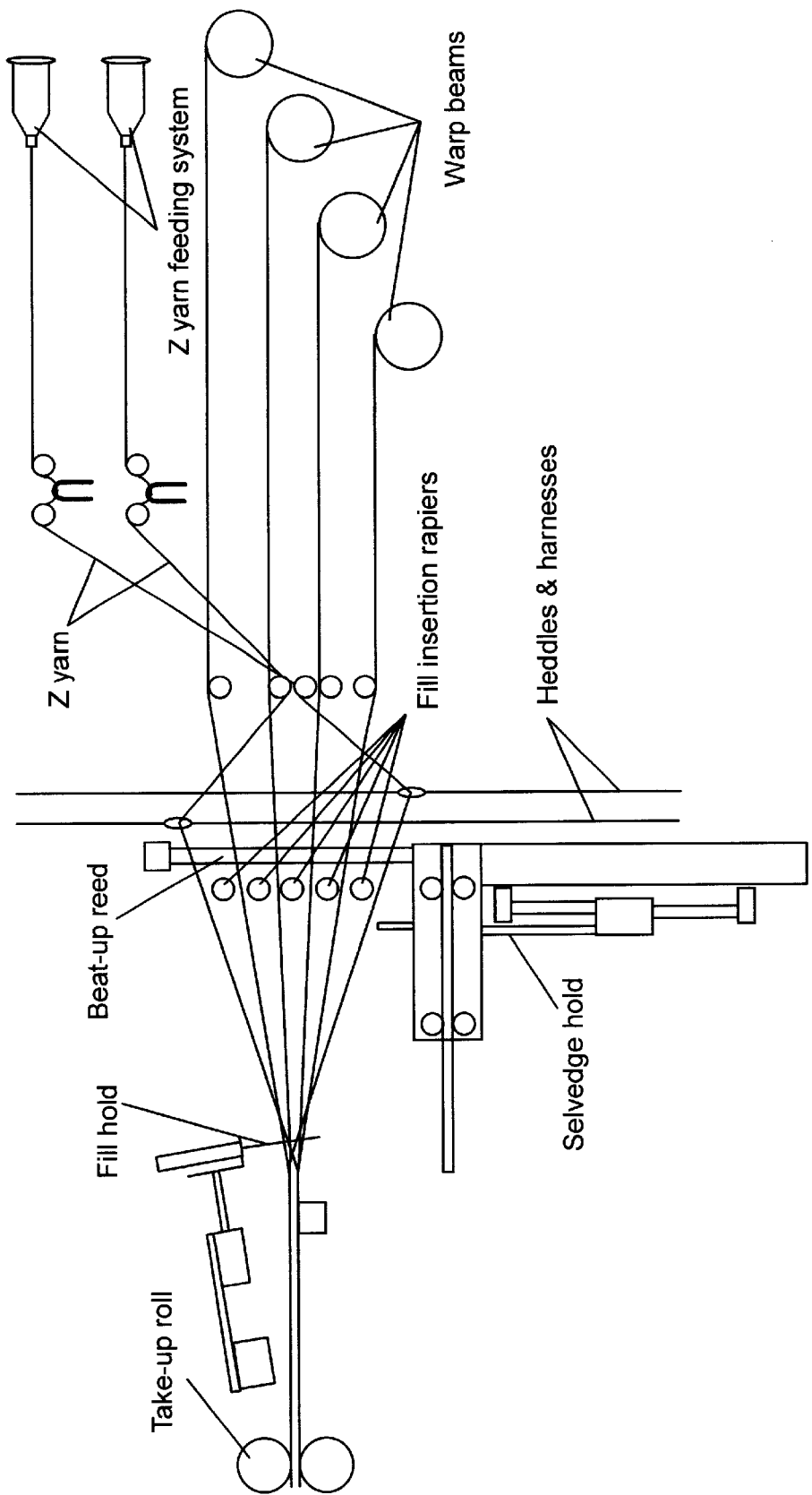
FIG. 4 shows a schematic of a 3-D orthogonal weaving according to PRIOR ART.

Referring now to FIG. 3, a process schematic diagram is shown according to the present invention. More particularly, FIG. 3 is a schematic of a 3-D orthogonal weaving showing four (4) warp layers forming the X-direction yarn system, six (6) sets of harnesses for controlling and guiding the Z-yarn system—2 for top, 2 for bottom & for open up & for open down—non-hidden Z-yarn systems that form the surface floats which ultimately form the insertion hole or channel within the predetermined region of the fabric, preferably in a central region, more preferably centered or centrally located on the connector or attach point, and a plurality of fill layers forming the Y-direction yarn system. According to the present invention, the Y yarn system and the Z yarn system can be balanced or non-balanced. In a preferred embodiment, the Y and Z yarn systems are balanced. Referring now to FIG. 3 and to FIG. 5, the Z yarn system components 1 and 2, during weaving, are interwoven together and provide the surface floats, best shown in FIG. 5, which form the insertion hole portion of the preform according to the present invention. By way of comparison, FIG. 4 PRIOR ART weaving has fewer harnesses and no surface floats.

The process by which the shaped fabric with insertion hole(s) is formed will now be generally described with reference to the schematic shown in FIG. 3. Lengthwise or in the X-direction, the warp yarns (not shown) are drawn in under tension from a warp and tension system (not shown) between the heddles of harnesses 1 to 6, and through a beat up reed 12 and to the fabric formation zone 14. Crosswise or in the Y-direction, the fill yarns 22 or filling yarns are inserted between the warp layers using fill insertion means, preferably a rapier system (not shown) using fill insertion rapiers. In a preferred embodiment, all the six harnesses cross for every fill insertion cycle in the sections of the fabric without the hole(s) 30 (also shown in FIGS. 1 and 2), i.e., the main body of the fabric 32. During the weaving of the area having the hole(s), harnesses # 3, 4, 5, and 6, which are carrying Z yarns 26, cross for every fill insertion cycle to the bottom and top parts, respectively, while harnesses #1 and 2 remain still or inactivated at that point in the fill insertion cycle, thereby causing the Z yarns to float at the top 8 and bottom surfaces of the fabric (best shown in the preform of FIG. 1) or within top 9A and bottom parts 9B. At this hole(s) section, the top and bottom parts of the fabric are not connected, i.e., they form distinct layers or parts. Notably, in traditional 3-D weaving patterns, there is not separation between top and bottom parts. FIG. 5 illustrates a perspective and partial cross-sectional view of a 3-D weaving material as it exits the weaving machine, with top and bottom parts of each side of the connector on the same plane, either top surface or bottom surface, respectively, as the material is woven. At the end of the hole(s) section formation shown in the middle region of FIG. 5, the harnesses # 1 and 2 resume crossing, thereby connecting the top and bottom parts together once again; note that these harness crossings of #1 and 2-Z yarns actually form the connector neck or thickness of the connector hole region (not diameter).

During the weaving process according to the present invention, when the Z yarn system components 1 & 2 float on the surface of the fabric or are hidden inside the fabric as it is being constructed, the length or distance of the float determines the length of the hole in the preform and finished composite structure. The length of a hole in the structure is a function of fill insertion per unit length (I) and the number of fill yarn insertion cycle (N) completed while Z yarns 1 & 2 float (harnesses for Z yarns 1 & 2 do not cross during this period). The hole length L in the preform and the hole diameter D in the finished composite structure can be calculated as $L=N/I$ and $D=2L/\pi$. For example, if fill insertion per unit length is 4 insertion per cm and 6 insertions completed while Z yarns 1 & 2 float, the hole length L is $L=N/I=6/4=1.5$ cm. The hole diameter D in the finished composite structure is then $D=2L/\pi=2\times1.5/\pi=0.95$ cm.

Also, a tension compensation system for z yarns is constructed and arranged to maintain tension levels constantly during weaving process. As the Z yarns move and are subject to the tension compensation system, the length of the Z yarns also changes, thus making the tension control necessary. Typically, tension ranges for the tension compensation system are between about 20 gram to 400 gram, depending upon the type and tow size of Z yarns used in the structure, fabric thickness, the number of warp layers, and other process parameters.

Referring now to FIG. 3, which illustrates the 3-D weaving process schematic according to the present invention from the prior art, in the present invention there is additional movement of the Z-yarn system, as compared with prior art weaving. Six Z-yarn harnesses are used in the configuration according to the present invention. The additional movement of the Z-yarn system is not obvious because this movement creates non-uniformity in the fabric that is constructed in a typical prior art 3-D woven fabric; prior art teaches the benefits of weaving uniformity throughout the entire body of the fabric woven in order to produce a fabric having consistent and reasonably predictable properties. Thus, according to prior art, for standard infrastructure and component applications of 3-D woven structures, including performs and composite structures formed therewith, non-uniformities are undesirable; as such, the present invention is nowhere taught or suggested in the prior art. Rather, the present invention intentionally introduces non-uniform regions with the Z-yarn floats on the surface, which later form the connector holes within the body of the fabric.

In one embodiment according to the present invention, the three-dimensional (3-D) fabric according to the present invention is formed of at least one high-performance fiber array within a three-dimensional weave construction, which has at least one warp layer. The 3-D fabric is engineered and constructed to form a predetermined structure, having a predetermined cross-sectional shape. The dimensions of the overall structure and of the cross-section can be varied, based upon the desired size and shape of the fabric and final composite structure. Additionally, the cross-sectional shape can be varied, based upon the desired shape of the fabric and final composite structure and end use thereof. Significantly, modifications to the 3-D weaving machine and process for manufacturing a shaped 3-D fabric with insertion holes does not require major modifications to the typical 3-D weaving machine.

Also, in one embodiment of the present invention, the 3-D fabric is impregnated using a resin infusion molding method and then cured at designated temperature. The fabric is first constructed and fabricated on a weaving machine thereby producing a preform, which is placed in a shaped mold having predetermined dimensions sized and constructed to produce a near-final shape composite. Typically, the time for the resin infusion process takes 5–30 minutes depending on the type of fiber in the perform, the dimensions of the perform, type of resin distribution system, resin viscosity, vacuum or pressure level, and other process parameters. Advantageously, the increased interstices of the 3-D fabric promote resin flow within the fabric and significantly reduce resin infusion time. After the whole preform structure is completely saturated with resin, the composite system is cured at a designated temperature ranged from room temperature to approximately 175 degree Celsius depending on the resin system used in the composite structure.

In one type of preferred embodiment, the present invention is used to form a rigid composite structure having at least one insertion hole therein for use as a connector or attach point. The rigid composite structure includes a preform that is constructed of a single-component, 3-D woven fabric, shown in FIG. 1. A disclosure of traditional 3-D woven fabric and method for forming the same is provided in U.S. Pat. Nos. 5,085,252 and 5,465,760, as set forth in the foregoing. The 3-D woven fabric, generally referenced 10, shows three substantially perpendicular yarn systems, respectively positioned in an X direction, a Y direction, and a Z direction, as shown. The 3-D woven fabric includes at least one high performance fiber array in one of the X, Y, or Z directions. In a preferred embodiment the warp direction, or X direction, comprises high performance fibers selected from the group consisting of carbon, aramid, fiberglass, polyester, and the like. Alternatively, the Y and Z directions also include high performance fibers for increased impact resistance, strength, shear strength, compression characteristics, enhanced resistance to delamination, and overall uniformity and structural integrity.

In one embodiment, the fabric is formed of high-performance fiber selected from the group consisting of aramid fibers, polyolefins, ultra high molecular weight polyethylene and high molecular weight polyethylene, high modulus nylon, and liquid crystal polymer-based fiber, carbon, aramid, and fiberglass.

In a preferred embodiment of the present invention, the shaped three-dimensional fabrics have two or more warp layers. The warp ends are between 1.5 to 12 ends per cm per layer. The fill insertion per unit length is between 1.5 to 12 insertions per cm.

Other high-performance fibers having a tensile strength of greater than about 5 grams per denier may be used; preferably, the high performance fibers have a tensile strength of greater than 7 grams per denier. The engineered fiber construction may be woven, multiaxial woven, or similar means of constructing multilayer fiber arrays within a single-component, integrated fabric body including insertion holes and formed on a single machine.

The shaped 3-D fabric including insertion holes is then placed in a predetermined mold for forming the overall shape and configuration of the shaped 3-dimensional fabric having insertion holes and the multilayer composite structure formed therefrom. The fabric remains shape with the support of the shaped mold and under vacuum and/or pressure during molding process including resin infusion and resin curing. The molding takes about 5–60 minutes at a temperature range from 20 to 175 degree Celsius. Post cure of resin may be used to improve the toughness of the composite structure at a temperature up to 150 degree Celsius. Importantly, the increased interstices of the 3-D fabric promote resin flow within the fabric, uniform resin distribution throughout the 3-D shaped fabric, and significantly reduce resin cure time.

The present invention is further directed to a method for forming a shaped 3-dimensional fabric with insertion holes and rigid composite structure made therefrom for infrastructure and connector applications, including the steps of providing at least one 3-D engineered fiber structure having insertion hole(s) therein, molding or otherwise manipulating the structure to produce a predetermined shape, and treating and stabilizing the structure via heat and/or pressure. An additional step may include introducing a resin into the at least one 3-D engineered fiber structure prior to molding the structure. Another additional step may include applying a finish to the surface of the shaped composite fiber structure after it has been stabilized, depending upon the application for which the finished structure will be used.

Certain modifications and improvements will occur to those skilled in the art upon a reading of the foregoing description but are not included for the sake of conciseness. By way of example, the Z yarns may be woven into sub-sections of a shaped 3D fabric structure instead of floating at the surface of it. It should be understood that all such modifications and improvements have been deleted herein for the sake of conciseness and readability but are properly within the scope of the following claims.

The present invention may, of course, be carried out in other specific ways than those set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

We claim:

1. A shaped three-dimensional fiber structure for use as a connector comprising:

a three-dimensional engineered fiber structure constructed to form a predetermined shape having at least one insertion hole therein, the three-dimensional engineered fiber structure having a singular, unitary component construction for providing substantially uniform structure and characteristics, wherein the structure comprises at least three yarn systems, one each in an X, Y, and Z direction, thereby forming a substantially orthogonal 3-D woven structure.

2. The shaped three-dimensional fiber structure according to claim 1, wherein the structure has a seamless construction.

3. The shaped three-dimensional fiber structure according to claim 1, wherein the structure is formed from at least one high performance fiber array.

4. The shaped three-dimensional fiber structure according to claim 1, wherein the structure is formed using a 6-harness Z-yarn system 3-D weaving machine configuration.

5. The shaped 3-D fiber structure according to claim 4, wherein two of the 6 harness Z-yarn system are arranged to produce surface floats for a predetermined distance.

6. A method for forming a composite multilayer shaped three-dimensional preform structure comprising at least three yearn systems, one each in an X, Y, and Z direction, thereby forming a substantially orthogonal 3-D woven structure, for use infrastructure applications comprising the steps of:

providing a 3-D engineered fiber structure having a predetermined cross-sectional shape with at least one insertion hole therein; and stabilizing the structure in the predetermined shape using a shaped, closed molding.

7. The method according to claim 6, further including a resin that is introduced into the fiber preform and molding.

8. The method according to claim 6, wherein the 3-D fiber preform structure is capable of being manufactured in a continuous series on a single machine.

* * * * *